(12) United States Patent
Sim (10) Patent No.: US 11,558,331 B2
(45) Date of Patent: Jan. 17, 2023

(54) METHOD, SYSTEM, AND NON-TRANSITORY COMPUTER-READABLE RECORDING MEDIUM TO FILTER CHATROOM MESSAGES

(71) Applicant: LINE Plus Corporation, Seongnam-si (KR)

(72) Inventor: Jaesik Sim, Seongnam-si (KR)

(73) Assignee: LINE PLUS CORPORATION, Seongnam-si (KR)

(*) Notice: Subject to any disclaimer, the term of this patent is extended or adjusted under 35 U.S.C. 154(b) by 0 days.

(21) Appl. No.: 17/579,892

(22) Filed: Jan. 20, 2022

(65) Prior Publication Data
US 2022/0247706 A1 Aug. 4, 2022

(30) Foreign Application Priority Data
Feb. 4, 2021 (KR) .......................... 10-2021-0015999

(51) Int. Cl.
*H04L 51/212* (2022.01)
*H04L 51/10* (2022.01)
*H04L 51/046* (2022.01)
*H04L 51/224* (2022.01)

(52) U.S. Cl.
CPC .......... *H04L 51/212* (2022.05); *H04L 51/046* (2013.01); *H04L 51/10* (2013.01); *H04L 51/224* (2022.05)

(58) Field of Classification Search
CPC ..... H04L 51/00; H04L 51/212; H04L 51/224; H04L 51/046; H04L 51/10
See application file for complete search history.

(56) References Cited

U.S. PATENT DOCUMENTS

| 10,762,057 | B2* | 9/2020 | Yi | ........................... G06F 9/451 |
| 2018/0302231 | A1* | 10/2018 | Sung | ................. H04M 1/72436 |
| 2019/0026306 | A1* | 1/2019 | Choi | ..................... H04L 65/403 |

FOREIGN PATENT DOCUMENTS

KR 10-2002-0074304 9/2002

* cited by examiner

*Primary Examiner* — Sargon N Nano
(74) *Attorney, Agent, or Firm* — Staas & Halsey LLP (57) ABSTRACT

Disclosed is a method, system, and non-transitory computer-readable record medium for filtering chatroom messages. The message processing method includes setting at least one filter condition related to a chatroom for at least one chatroom on a messenger; and displaying a message corresponding to the filter condition among messages included in the chatroom.

17 Claims, 12 Drawing Sheets

Process message corresponding to filter condition to be distinguished from other messages — S530

Share message corresponding to filter condition with another user — S540

METHOD, SYSTEM, AND NON-TRANSITORY COMPUTER-READABLE RECORDING MEDIUM TO FILTER CHATROOM MESSAGES

CROSS-REFERENCE TO RELATED APPLICATION(S)

This U.S. non-provisional application and claims the benefit of priority under 35 U.S.C. § 119 to Korean Patent Application No. 10-2021-0015999, filed Feb. 4, 2021, the entire contents of which are incorporated herein by reference in their entirety.

BACKGROUND

Technical Field

Some example embodiments relate to technology for processing chatroom messages.

Related Art

An instant messenger that is a general community tool may transmit and receive messages or data in real time and allow a user to register a contact on a messenger and to transmit and receive messages with a counterpart included in a contact list.

Such a messenger function allows the use of a messenger to be popular not only in a personal computer (PC) environment but also in a mobile environment of a mobile communication terminal.

For example, a mobile messenger service system and method of a portable terminal using a wireless communication network for providing a messenger service between mobile messengers installed on portable terminals is disclosed in Korean Patent Laid-Open Publication No. 10-2002-0074304, published on Sep. 30, 2002.

SUMMARY

Some example embodiments may display only a message desired by a user on a screen by applying a filter condition related to a chatroom.

Some example embodiments may store a filter being frequently used and may easily and quickly apply to a chatroom by using or editing the filter.

Some example embodiments may process a message corresponding to a specific filter to be distinguished from other messages when receiving a message.

According to an aspect of at least one example embodiment, there is provided a method including executing, by at least one processor, computer-readable instructions stored in at least one memory to provide a process including: setting at least one filter condition to filter messages in at least one chatroom on a messenger, the set at least one filter condition being applied to the messages to thereby provide a filter result including at least one message of the messages that satisfied the applied set at least one filter condition; and displaying the at least one message.

The displaying may include, in response to setting the at least one filter condition to filter messages in a chatroom in which a user is currently staying, displaying the at least one message on a screen of the chatroom; and in response to setting the at least one filter condition as a common condition to filter messages in all chatrooms on the messenger, displaying the at least one message through a separate interface screen in a list format or a chatroom format.

The setting may include providing a filter list applicable to filter the messages in the at least one chatroom as a setting screen for setting the at least one filter condition, and the filter list may be configured based on a chat history in the at least one chatroom.

The filter list may include a message type filter for setting, as a filter condition of the at least one filter condition, at least one message type among a text message type, an image message type, a video message type, an audio message type, a call message type, and a sticker message type, and the message type filter may be configured as a message type of a filter having a chat history in the at least one chatroom.

The message type filter may include a message type list in which a chat history is present.

The filter list may correspond to a type of the at least one chatroom, so that different filter lists are provided for different types of chatrooms.

The setting may include setting a filter condition of the at least one filter condition using a filter condition stored in a bookmark.

The process may further include sharing the at least one filter condition or the at least one message through a chatroom with another user selected by a user.

The process may further include processing the at least one message to distinguish the at least one message from other messages.

The processing may include outputting a message reception notification for the at least one message in a format different from that of the other messages.

The processing may include storing the at least one message in a separate message inbox.

According to an aspect of at least one example embodiment, there is provided a non-transitory computer-readable recording medium storing computer-readable instructions that are executable by at least one processor to provide the process.

According to an aspect of at least one example embodiment, there is provided a computer apparatus including at least one memory storing computer-readable instructions, and at least one processor that executes the computer-readable instructions stored in the at least one memory to provide a process including: setting at least one filter condition to filter messages in at least one chatroom on a messenger, the set at least one filter condition being applied to the messages to thereby provide a filter result including at least one message that satisfied the applied set at least one filter condition, and displaying the at least one message.

Further areas of applicability will become apparent from the description provided herein. The description and specific examples in this summary are intended for purposes of illustration only and are not intended to limit the scope of the present disclosure.

DETAILED DESCRIPTION

One or more example embodiments will be described in detail with reference to the accompanying drawings. Example embodiments, however, may be embodied in various different forms, and should not be construed as being limited to only the illustrated embodiments. Rather, the illustrated embodiments are provided as examples so that this disclosure will be thorough and complete, and will fully convey the concepts of this disclosure to those skilled in the art. Accordingly, known processes, elements, and techniques, may not be described with respect to some example embodiments. Unless otherwise noted, like reference characters denote like elements throughout the attached drawings and written description, and thus descriptions will not be repeated.

As used herein, the singular forms "a," "an," and "the," are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups, thereof. As used herein, the term "and/or" includes any and all combinations of one or more of the associated listed products.

Expressions such as "at least one of," when preceding a list of elements, modify the entire list of elements and do not modify the individual elements of the list. Also, the term "exemplary" is intended to refer to an example or illustration.

Unless otherwise defined, all terms (including technical and scientific terms) used herein have the same meaning as commonly understood by one of ordinary skill in the art to which example embodiments belong. Terms, such as those defined in commonly used dictionaries, should be interpreted as having a meaning that is consistent with their meaning in the context of the relevant art and/or this disclosure, and should not be interpreted in an idealized or overly formal sense unless expressly so defined herein.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as one computer processing device; however, one skilled in the art will appreciate that a hardware device may include multiple processing elements and multiple types of processing elements. For example, a hardware device may include multiple processors or a processor and a controller. In addition, other processing configurations are possible, such as parallel processors.

Hereinafter, example embodiments will be described with reference to the accompanying drawings.

The example embodiments relate to technology for processing a message included in a chatroom.

The example embodiments including the disclosures herein may display only a message desired by a user on a screen by applying a filter condition related to a chatroom and, through this, may achieve many advantages in terms of convenience, accessibility, quality of service (QoS), and the like.

A message processing system according to example embodiments may be implemented by at least one computer apparatus and a message processing method according to example embodiments may be performed through at least one computer apparatus included in the message processing system. Here, a computer program according to an example embodiment may be installed and run on the computer apparatus. The computer apparatus may perform the message processing method according to example embodiments under control of the running computer program. The computer program may be stored in non-transitory computer-readable record medium to computer-implement the message processing method in conjunction with the computer apparatus.

Figure 1:
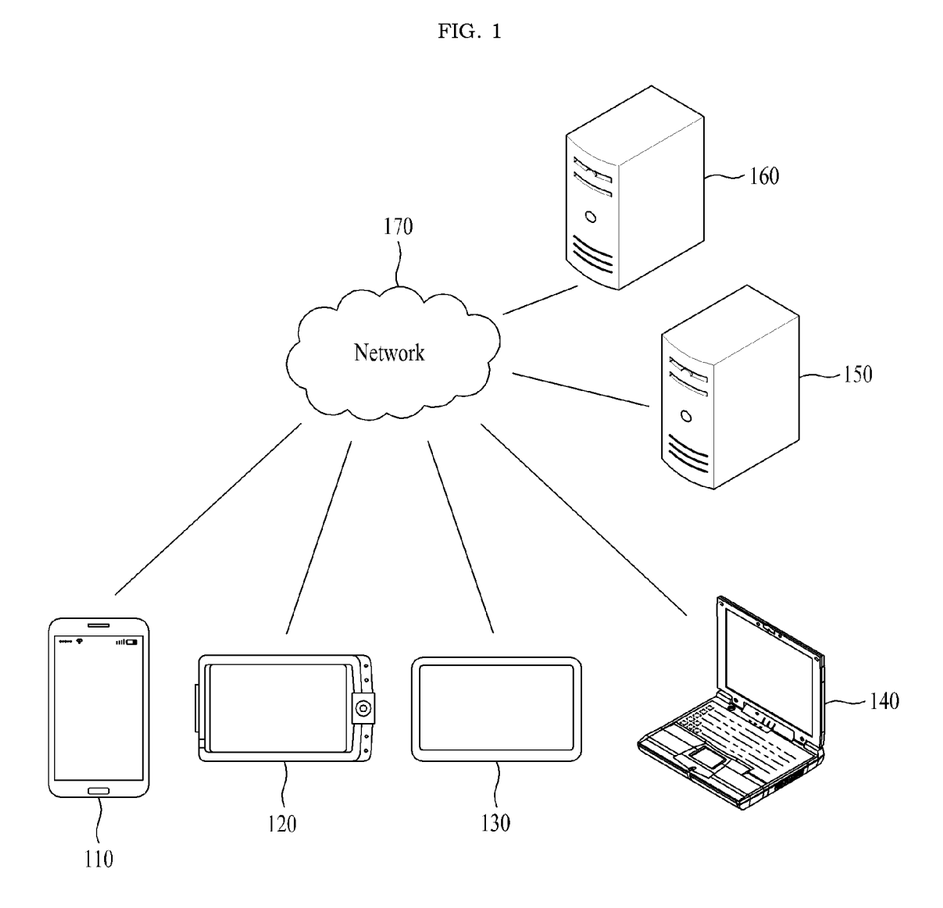
FIG. 1 is a diagram illustrating an example of a network environment according to at least one example embodiment.

FIG. 1 illustrates an example of a network environment according to at least one example embodiment. Referring to FIG. 1, the network environment may include a plurality of electronic devices 110, 120, 130, and 140, a plurality of servers 150 and 160, and a network 170. FIG. 1 is provided as an example only. A number of electronic devices or a number of servers is not limited thereto. Also, the network environment of FIG. 1 is provided as an example only among environments applicable to the example embodiments and an environment applicable to the example embodiments is not limited to the network environment of FIG. 1.

Each of the plurality of electronic devices 110, 120, 130, and 140 may be a fixed terminal or a mobile terminal that is configured as a computer apparatus. For example, the plurality of electronic devices 110, 120, 130, and 140 may be a smartphone, a mobile phone, a navigation device, a computer, a laptop computer, a digital broadcasting terminal, a personal digital assistant (PDA), a portable multimedia player (PMP), a tablet PC, and the like. For example, although FIG. 1 illustrates a shape of a smartphone as an example of the electronic device 110, the electronic device 110 used herein may refer to one of various types of physical computer apparatuses capable of communicating with other electronic devices 120, 130, and 140, and/or the servers 150 and 160 over the network 170 in a wireless or wired communication manner.

The communication scheme is not limited and may include a near field wireless communication scheme between devices as well as a communication scheme using a communication network (e.g., a mobile communication network, wired Internet, wireless Internet, a broadcasting network, etc.) includable in the network 170. For example, the network 170 may include at least one of network topologies that include a personal area network (PAN), a local area network (LAN), a campus area network (CAN), a metropolitan area network (MAN), a wide area network (WAN), a broadband network (BBN), and the Internet. Also, the network 170 may include at least one of network topologies that include a bus network, a star network, a ring network, a mesh network, a star-bus network, a tree or hierarchical network, and the like. However, they are provided as examples only.

Each of the servers 150 and 160 may be configured as a computer apparatus or a plurality of computer apparatuses that provides an instruction, a code, a file, content, a service, etc., through communication with the plurality of electronic devices 110, 120, 130, and 140 over the network 170. For example, the server 150 may be a system that provides a service, for example, a messenger service, to the plurality of electronic devices 110, 120, 130, and 140 connected over the network 170.

Figure 2:
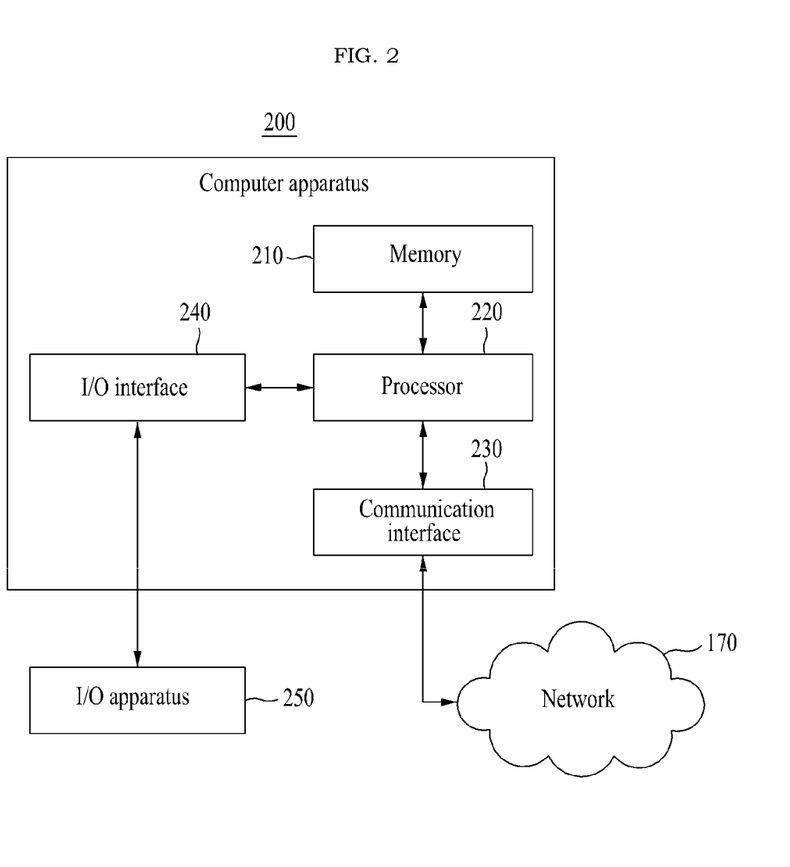
FIG. 2 is a diagram illustrating an example of a computer apparatus according to at least one example embodiment.

FIG. 2 is a block diagram illustrating an example of a computer apparatus according to at least one example embodiment. Each of the plurality of electronic devices 110, 120, 130, and 140 or each of the servers 150 and 160 may be implemented by a computer apparatus 200 of FIG. 2.

Referring to FIG. 2, the computer apparatus 200 may include a memory 210, a processor 220, a communication interface 230, and an input/output (I/O) interface 240. The memory 210 may include a permanent mass storage device, such as a random access memory (RAM), a read only memory (ROM), and a disk drive, as a non-transitory computer-readable record medium. The permanent mass storage device, such as ROM and a disk drive, may be included in the computer apparatus 200 as a permanent storage device separate from the memory 210. Also, an OS and at least one program code may be stored in the memory 210. Such software components may be loaded to the memory 210 from another non-transitory computer-readable record medium separate from the memory 210. The other non-transitory computer-readable record medium may include a non-transitory computer-readable record medium, for example, a floppy drive, a disk, a tape, a DVD/CD-ROM drive, a memory card, etc. According to other example embodiments, software components may be loaded to the memory 210 through the communication interface 230, instead of the non-transitory computer-readable record medium. For example, the software components may be loaded to the memory 210 of the computer apparatus 200 based on a computer program installed by files received over the network 170.

The processor 220 may be configured to process instructions of a computer program by performing basic arithmetic operations, logic operations, and I/O operations. The computer-readable instructions may be provided from the memory 210 or the communication interface 230 to the processor 220. For example, the processor 220 may be configured to execute received instructions in response to a program code stored in a storage device, such as the memory 210.

The communication interface 230 may provide a function for communication between the communication apparatus 200 and another apparatus, for example, the aforementioned storage devices. For example, the processor 220 of the computer apparatus 200 may forward a request or an instruction created based on a program code stored in the storage device such as the memory 210, data, and a file, to other apparatuses over the network 170 under control of the communication interface 230. Inversely, a signal, an instruction, data, a file, etc., from another apparatus may be received at the computer apparatus 200 through the communication interface 230 of the computer apparatus 200. For example, a signal, an instruction, data, etc., received through the communication interface 230 may be forwarded to the processor 220 or the memory 210, and a file, etc., may be stored in a storage medium, for example, the permanent storage device, further includable in the computer apparatus 200.

The I/O interface 240 may be a device used for interface with an I/O apparatus 250. For example, an input device may include a device, such as a microphone, a keyboard, a mouse, etc., and an output device may include a device, such as a display, a speaker, etc. As another example, the I/O interface 240 may be a device for interface with an apparatus in which an input function and an output function are integrated into a single function, such as a touchscreen. The I/O apparatus 250 may be configured as a single apparatus with the computer apparatus 200.

According to other example embodiments, the computer apparatus 200 may include a number of components greater than or less than a number of components shown in FIG. 2. However, there is no need to clearly illustrate many components according to the related art. For example, the computer apparatus 200 may include at least a portion of the I/O apparatus 250, or may further include other components, for example, a transceiver, a database (DB).

Hereinafter, example embodiments of a method and system for filtering chatroom messages are described.

Figure 3:
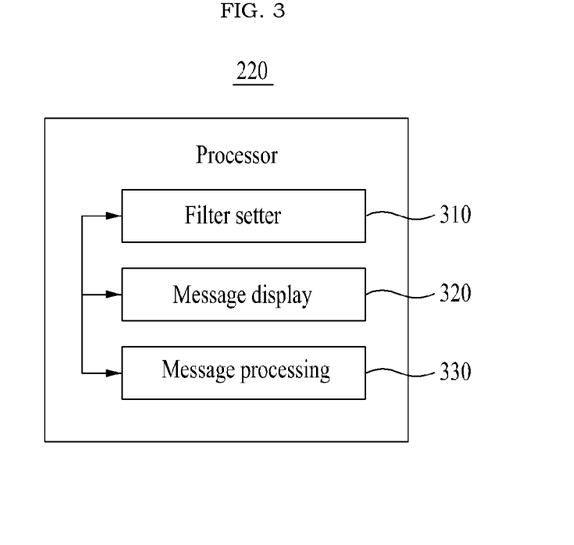
FIG. 3 is a diagram illustrating an example of a component includable in a processor of a computer apparatus according to at least one example embodiment.

FIG. 3 is a diagram illustrating an example of a component included in a processor of a computer apparatus according to at least one example embodiment.

The computer apparatus 200 according to the example embodiment may provide a client with a messenger service through access to a website/mobile site related to the computer apparatus 200 or a dedicated application installed on the client. A computer-implemented message processing system may be configured in the computer apparatus 200. For example, the message processing system may be implemented in a form of a program that independently operates or may be configured in an in-app form of a specific application to run on the specific application.

Figure 4:
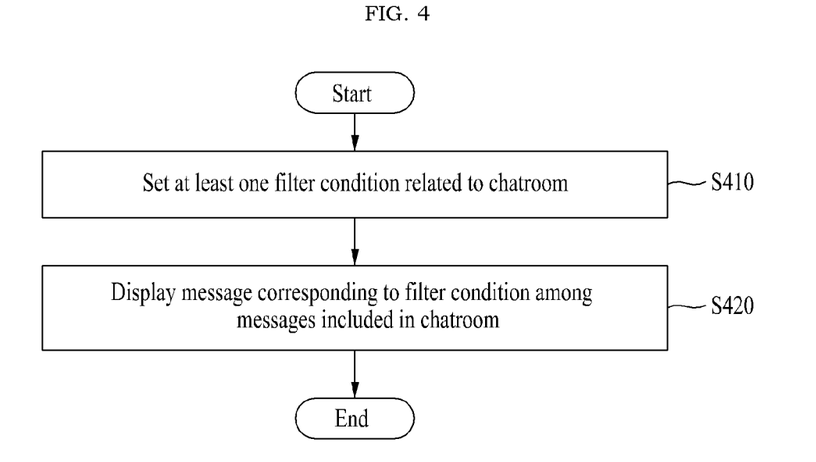
FIG. 4 is a flowchart illustrating an example of a method performed by a computer apparatus according to at least one example embodiment.

Referring to FIG. 3, to perform the message processing method of FIG. 4, the processor 220 of the computer apparatus 200 may include a filter setter 310, a message display 320, and a message processing 330. Depending on example embodiments, the components of the processor 220 may be selectively included in or excluded from the processor 220. Also, depending on example embodiments, the components of the processor 220 may be separated or merged for representations of functions of the processor 220.

The processor 220 and the components of the processor 220 may control the computer apparatus 200 to perform operations included in the following message processing method of FIG. 4. For example, the processor 220 and the components of the processor 220 may be configured to execute an instruction according to a code of at least one program and a code of an OS included in the memory 210.

Here, the components of the processor 220 may be representations of different functions of the processor 220 performed by the processor 220 in response to an instruction provided from the program code stored in the computer apparatus 200. For example, the filter setter 310 may be used as a functional representation of the processor 220 that controls the computer apparatus 200 to set a filter condition in response to the aforementioned instruction.

The processor 220 may read a necessary instruction from the memory 210 to which instructions associated with control of the computer apparatus 200 are loaded. In this case, the read instruction may include an instruction for controlling the processor 220 to perform the following message processing method.

Operations included in the following message processing method may be performed in order different from illustrated order. A portion of the operations may be omitted or an additional process may be further included.

FIG. 4 is a flowchart illustrating an example of a message processing method performed by a computer apparatus according to at least one example embodiment.

Referring to FIG. 4, in operation 5410, the filter setter 310 may set at least one filter condition related to a chatroom based on a user input. A filter applicable to the chatroom may use information related to the chatroom and may include, for example, a time filter, a message type filter, and a participant filter. The time filter may be set as a period (start date and end date) or a unit time (e.g., a date unit) to use a message transmission time as a filter. Also, a message type transmittable or receivable through the chatroom, for example, a text, an image, a video, an audio, a call, and a sticker, may be used as a filter. A user, that is, a participant of the chatroom may be used as the filter.

The filter setter 310 may generate a filter condition that includes a filter selected by a user. Here, the filter setter 310 may generate a single condition including a single filter or a multi-condition including a plurality of filters. For example, the filter setter 310 may set a filter condition to be applied to a specific chatroom in which the user is currently staying among chatrooms on a messenger. As another example, the filter setter 310 may set a filter condition to be applied to all chatrooms on the messenger.

The filter setter 310 may provide a bookmark function for the filter condition. The filter setter 310 may store a filter condition frequently used by the user using a bookmark and may fetch and use one of filter conditions included in a bookmark list in response to a user request. A filter condition included in the bookmark list may be provided as an invariant fixed value. Depending on example embodiments, the filter condition included in the bookmark list may be provided as a variant value. That is, through an edition of fetching the filter condition frequently used by the user and adding or deleting some filters, the filter condition may be modified and used.

In operation 5420, the message display 320 may display a message corresponding to the filter condition set in operation 5410 among messages included in the chatroom.

For example, in response to a request for message filtering in a chatroom in which the user is currently staying, the message display 320 may display a message corresponding to a filter condition among messages included in the current chatroom on a corresponding chatroom screen. When the user enters a specific chatroom, the message display 320 may fetch messages included in the specific chatroom from a client message database (e.g., the memory 210) and may display the messages on a corresponding chatroom screen. Here, the message display 320 may add the filter condition to the chatroom in which the user is staying and may display only a message desired by the user on the chatroom screen.

As another example, in response to a request from the user for message filtering for all chatrooms on the messenger, the message display 320 may display a message corresponding to the filter condition among messages included in all the chatrooms through a separate interface screen as a filtering result. A filtering result screen may be provided through an interface screen in a list format or in a chatroom format. That is, the message display 320 may apply the filter condition to messages in all the chatrooms and may provide a filtering result of all the chatrooms through a single screen.

Therefore, according to the example embodiment, it is possible to add a filter condition to a chatroom on a messenger, and to retrieve and view only a message corresponding to the filter condition desired by a user from among messages included in the chatroom.

Figure 5:
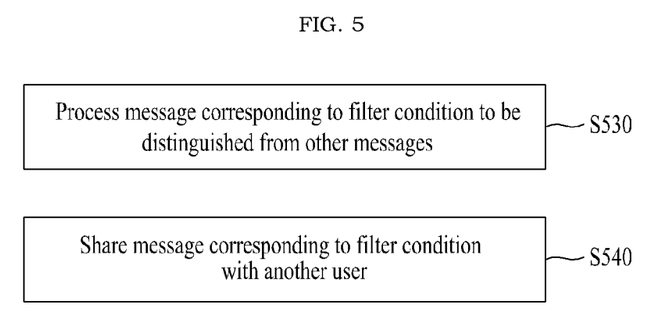
FIG. 5 is a flowchart illustrating another example of a method performed by a computer apparatus according to at least one example embodiment.

FIG. 5 is a flowchart illustrating another example of a message processing method performed by a computer apparatus according to at least one example embodiment. The message processing method of FIG. 5 may be included in the message processing method of FIG. 4 and, depending on example embodiments, may be performed as a separate process.

Referring to FIG. 5, in operation 5530, the message processing 330 may process the message corresponding to the filter condition among received messages to be distinguished from other messages (hereinafter, general messages).

For example, when a message corresponding to a filter condition is received, the message processing 330 may output a message reception notification in a format different from that of a general message. That is, the message processing 330 may output a reception notification for the message corresponding to the filter condition, that is, a sound (an alert sound), a vibration pattern, and a notification pop-up display method, in a manner different from that of the general message.

As another example, the message processing 330 may automatically store a message corresponding to the filter condition among received messages in a separate message inbox. In general, when a message is received, the received message may be stored as a message of a corresponding chatroom. Here, the message corresponding to the filter condition may be additionally automatically stored in the message inbox. The user may enter the message inbox and may collectively verify the message stored in the message inbox, that is, the message corresponding to the filter condition as a newly received message.

Therefore, according to the example embodiment, it is possible to process a message corresponding to the filter condition to be distinguished from general messages at a point in time at which the corresponding message is received.

In operation 5540, the message processing 330 may share the message corresponding to the filter condition with another user. For example, the message processing 330 may apply a filter condition to a chatroom on the messenger and may share a message group corresponding to the filter condition, that is, a filtering result through a chatroom with another user selected by the user. Here, all messages included in the filtering result may be shared or at least a portion of messages selected by the user from among the messages included in the filtering result may be shared.

Therefore, according to the example embodiment, a message corresponding to a filter condition may be easily shared with another user based on a unit of the filter condition.

Depending on example embodiments, at least one filter condition included in a bookmark list may be shared with another user. The message processing 330 may transmit the filter condition stored as a bookmark of the user in a kind of message type through a chatroom with another user. In the case of selecting a message corresponding to the filter condition, a receiving-side electronic device may execute a filter function using the corresponding filter condition and may immediately apply the filter function to the chatroom. Also, a message corresponding to the filter condition may be selected in the chatroom and then separately stored through downloading. If necessary, the downloaded filter condition may be fetched and applied through another chatroom as well as the chatroom that receives the filter condition.

FIGS. 6 to 12 illustrate examples of a chatroom message filter function according to at least one example embodiment.

FIGS. 6 to 12 illustrate an example of a screen, that is, a chatroom screen 600 on which a user enters a specific chatroom on a messenger. For example, FIGS. 6 to 12 illustrate a screen displayed on a display of the electronic device 110.

Figure 6:
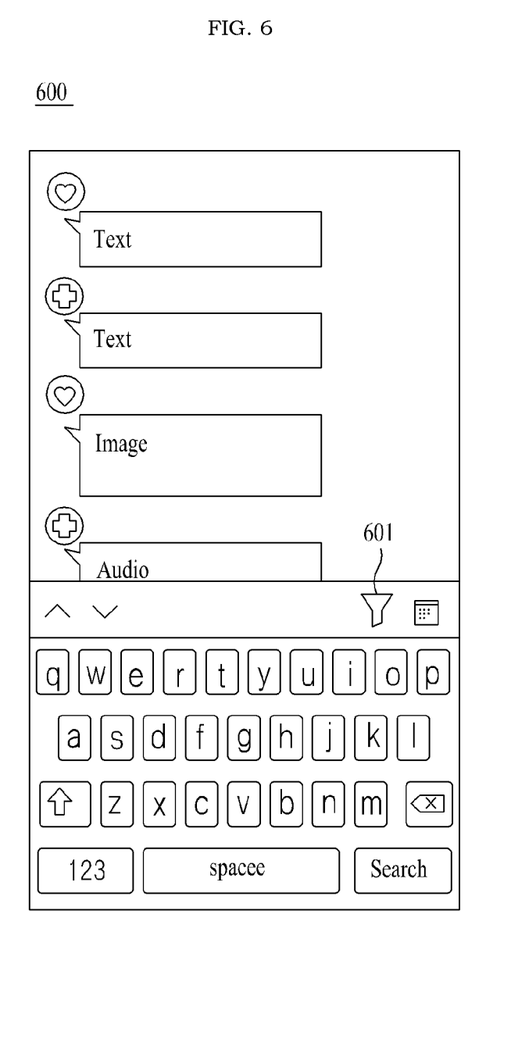
FIGS. 6 to 12 illustrate examples of a chatroom message filter function according to at least one example embodiment.

Referring to FIG. 6, when the user enters the specific chatroom on the messenger, the processor 220 may fetch a message included in the corresponding chatroom from a client message database and may display the message on a chatroom screen 600.

The chatroom screen 600 may include menus accessible to the respective functions provided from the messenger in addition to an interface for a message input.

Referring to FIG. 6, the chatroom screen 600 may include a "filter" menu 601 for executing a filter function as one of menus available in the corresponding chatroom.

The filter function for all chatrooms on the messenger may include the "filter" menu 601 as one of menus in an upper interface screen of the chatroom screen 600, such as a chatroom list and a friend list.

Figure 7:
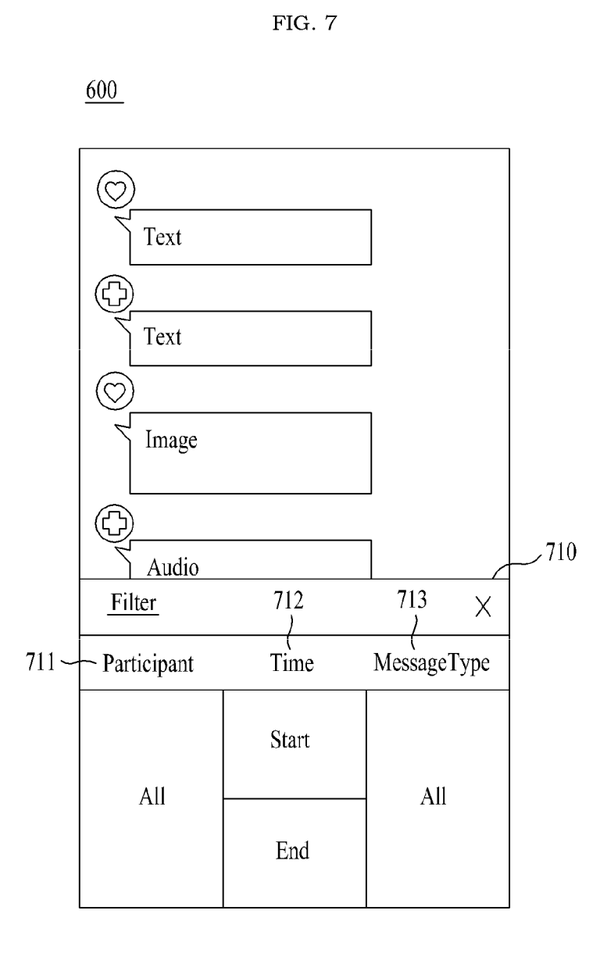

Referring to FIG. 7, in response to a selection on the "filter" menu 601 on the chatroom screen 600, the processor 220 may provide a filter condition setting screen 710.

The filter condition setting screen 710 may include a filter list applicable to a chatroom as an interface screen for setting a filter condition to be applied to the chatroom. For example, referring to FIG. 7, the filter list in the filter condition setting screen 710 may include a participant filter 711, a time filter 712, and a message type filter 713.

Depending on example embodiment, the filter list provided on the filter condition setting screen 710 may be configured differently according to a chatroom. A filter applicable to an openchat chatroom that allows an immediate chat using a link such as a uniform resource locator (URL) without a friend addition process using a telephone number or an ID and/or an official account chatroom representing an account in a form of a bot that provides various services or contents may be configured to be different from that of a general chatroom. For example, an openchat chatroom or an official account chatroom may provide a filter list in which a participant filter is absent. Therefore, a filter list specialized for a corresponding chatroom may be provided according to a type of the chatroom.

Figure 8:
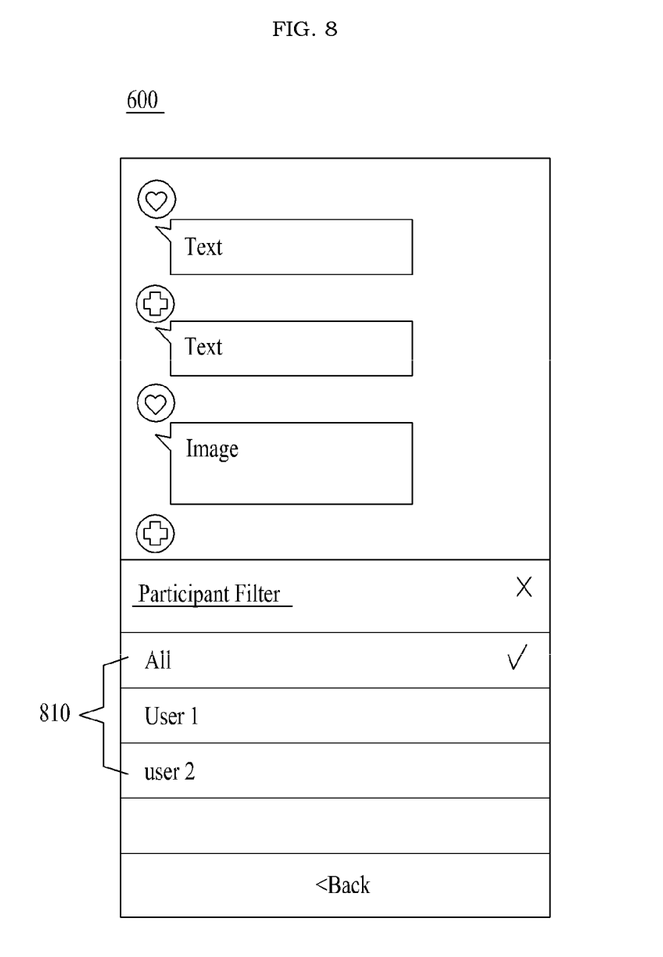

Referring to FIG. 8, in response to a selection on the participant filter 711 on the filter condition setting screen 710, the processor 220 may provide a participant list 810 for setting a participant as a message filter condition.

The participant list 810 may include participants included in the chatroom, that is, participating in a conversation, that is, a chat. The processor 220 may set all participants (all) or at least one individual participant as the filter condition according to a user input through the participant list 810.

Figure 9:
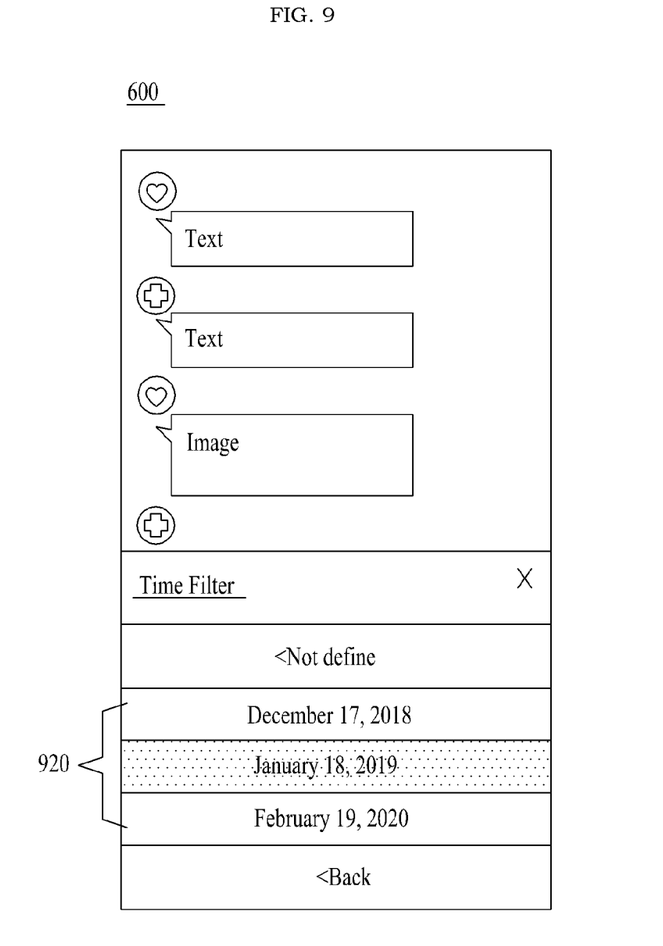

Referring to FIG. 9, in response to a selection on the time filter 712 on the filter condition setting screen 710, the processor 220 may provide a time setting interface 920 for setting a message transmission time as a message filter condition.

When a period is used as the filter condition, a start date and an end date may be set according to a user input through the time setting interface 920. Here, the time setting interface 920 may include a date list in which messages are transmitted and received through the corresponding chatroom. That is, a list of dates in which a chat is present in a chat history of the chatroom may be provided through the time setting interface 920. In addition to the period, another time unit, for example, a daily time unit may be set as the filter condition.

Figure 10:
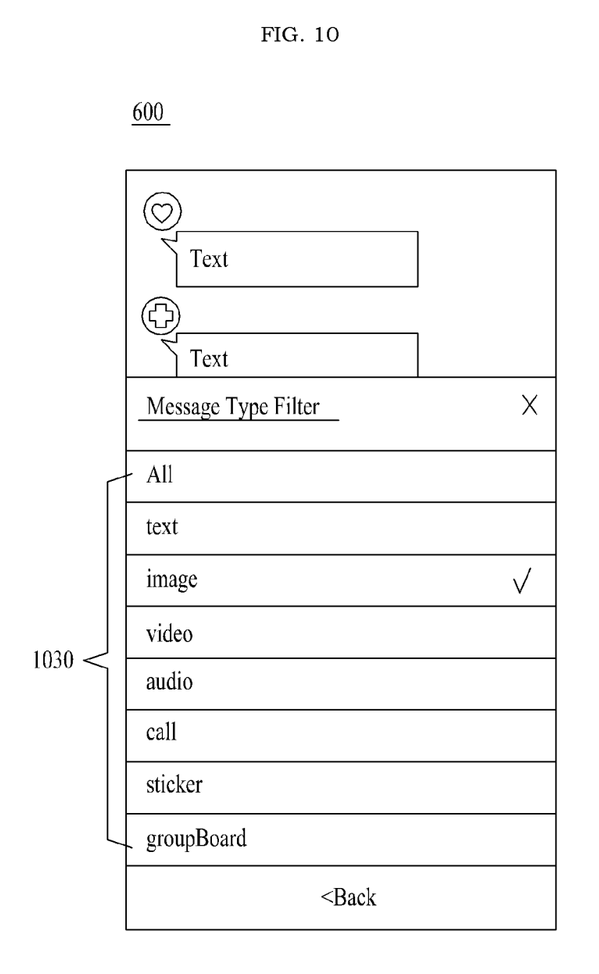

Referring to FIG. 10, in response to a selection on the message type filter 713 on the filter condition setting screen 710, the processor 220 may provide a message type list 1030 for setting a message type as a message filter condition.

As a message type applicable to a filter, the message type list 1030 may include, for example, a text filter for selecting a text message type, an image filter for selecting an image message type, a video filter for selecting a video message type, an audio filter for selecting an audio message type, a call filter for selecting a call message type, and a sticker filter for selecting a sticker message type. Here, the message type list 1030 may be configured based on messages included in the chatroom. The processor 220 may configure the message type list 1030 using a message type filter having an exchange history through the chatroom. For example, if a call history is absent in a chat history of the chatroom, the processor 220 may provide the message type list 1030 from which the call filter is excluded. The processor 220 may set all message types (all) or at least one message type as a filter condition according to a user input through the message type list 1030.

Figure 11:
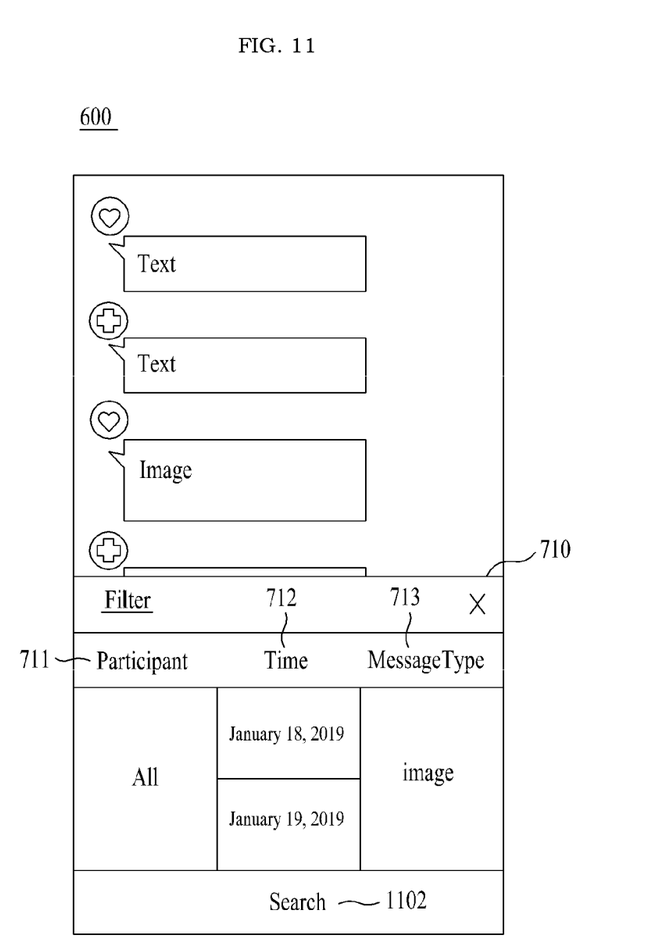

Referring to FIG. 11, when a filter condition setting is completed through the participant list 810, the time setting interface 920, and the message type list 1030, the processor 220 may display setting content of the filter condition on the filter condition setting screen 710. For example, FIG. 11 illustrates an example in which all participants are set to the participant filter 711, a period from Jan. 18, 2019 to Jan. 19, 2019 is set to the time filter 712, and an image filter is set to the message type filter 713.

When the user verifies setting content of the filter condition through the filter condition setting screen 710 and enters a message search button 1102 for executing a filter function, the processor 220 may retrieve messages corresponding to the filter condition and may provide the retrieved messages as a filtering result.

Figure 12:
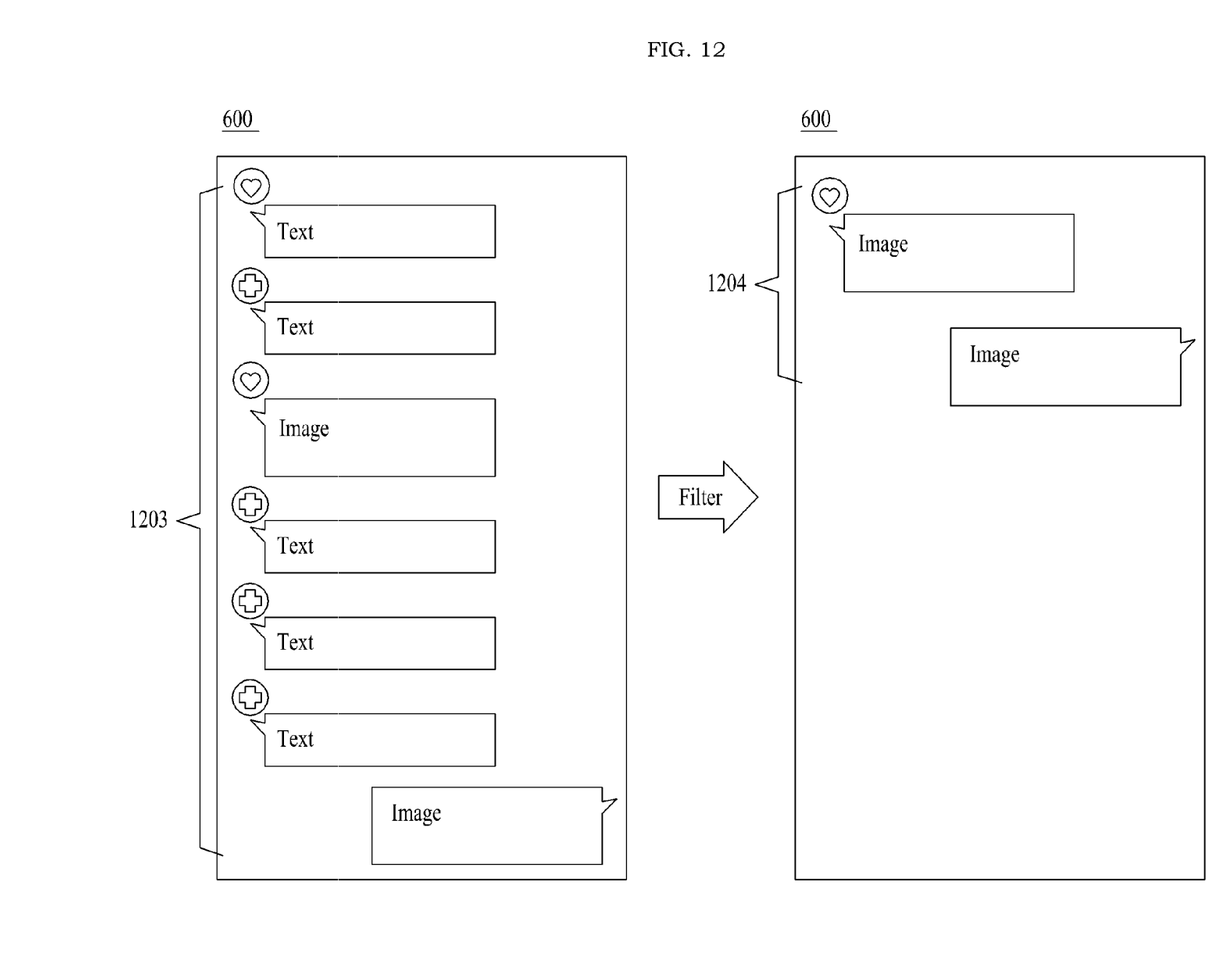

Referring to FIG. 12, in response to a selection on the message search button 1102 on the filter condition setting screen 710, the processor 220 may display only messages 1204 corresponding to the filter condition set through the filter condition setting screen 710 among all messages 1203 included in a chatroom in which the user is currently staying, on the corresponding chatroom screen 600. For example, if all participants are set to the participant filter 711, the period from Jan. 18, 2019 to Jan. 19, 2019 is set to the time filter 712, and the image filter is set to the message type filter 713, the processor 220 may select only messages corresponding to an image message type among messages exchanged among all the participants during the period from Jan. 18, 2019 to Jan. 19, 2019 and may display the selected messages on the chatroom screen 600.

Although description is made based on an example of executing a filter function in a specific chatroom, it is provided as an example only. The filter function may be executed for all chatrooms on the messenger.

In addition to a method of setting each filter condition through the filter condition setting screen 710, a filter condition prestored through bookmark may be fetched and immediately applied to the specific chatroom.

Also, in response to a user request, the processor 220 may share a message acquired through the filter function, that is, a filtering result through a chatroom with another user selected by the user.

The processor 220 may maintain a filter condition set as a common condition for all chatrooms or may maintain a filter condition set as an individual condition for each chatroom. When a message corresponding to the filter condition is received through the chatroom, the processor 220 may process the received message to be distinguished from a general message using an alert scheme or a storage scheme.

According to some example embodiments, it is possible to display only a message desired by a user on a screen by applying a filter condition related to a chatroom. Also, according to some example embodiments, it is possible to store a filter being frequently used and to easily and quickly apply to a chatroom by using or editing the filter. Also, according to some example embodiments, it is possible to process a message corresponding to a specific filter to be distinguished from other messages when receiving a message.

The systems or the apparatuses described above may be implemented using hardware components, software components, and/or a combination thereof. For example, the apparatuses and the components described herein may be implemented using one or more general-purpose or special purpose computers, for example, a processor, a controller, an arithmetic logic unit (ALU), a digital signal processor, a microcomputer, a field programmable gate array (FPGA), a programmable logic unit (PLU), a microprocessor, or any other device capable of responding to and executing instructions in a defined manner. The processing device may run an operating system (OS) and one or more software applications that run on the OS. The processing device also may access, store, manipulate, process, and create data in response to execution of the software. For simplicity, the description of a processing device is used as singular; however, one skilled in the art will be appreciated that a processing device may include multiple processing elements and/or multiple types of processing elements. For example, a processing device may include multiple processors or a processor and a controller. In addition, different processing configurations are possible, such as parallel processors.

The software may include a computer program, a piece of code, an instruction, or some combinations thereof, for independently or collectively instructing or configuring the processing device to operate as desired. Software and/or data may be embodied permanently or temporarily in any type of machine, component, physical equipment, virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more computer readable storage mediums.

The methods according to the above-described example embodiments may be configured in a form of program instructions performed through various computer devices and recorded in non-transitory computer-readable media. The media may continuously store computer-executable programs or may temporarily store the same for execution or download. Also, the media may be various types of recording devices or storage devices in a form in which one or a plurality of hardware components are combined. Without being limited to media directly connected to a computer system, the media may be distributed over the network. Examples of the media include magnetic media such as hard disks, floppy disks, and magnetic tapes; optical media such as CD-ROM and DVDs; magneto-optical media such as floptical disks; and hardware devices that are specially configured to store and perform program instructions, such as ROM, RAM, flash memory, and the like. Examples of other media may include recording media and storage media managed by an app store that distributes applications or a site, a server, and the like that supplies and distributes other various types of software. Examples of a program instruction may include a machine language code produced by a compiler and a high-language code executable by a computer using an interpreter.

While this disclosure includes specific example embodiments, it will be apparent to one of ordinary skill in the art that various alterations and modifications in form and details may be made in these example embodiments without departing from the spirit and scope of the claims and their equivalents. For example, suitable results may be achieved if the described techniques are performed in a different order, and/or if components in a described system, architecture, device, or circuit are combined in a different manner, and/or replaced or supplemented by other components or their equivalents.

What is claimed is:

1. A method comprising: executing, by at least one processor, computer-readable instructions stored in at least one memory to provide a process including: setting at least one filter condition to filter messages in at least one chatroom on a messenger, the set at least one filter condition being applied to the messages to thereby provide a filter result including at least one message of the messages that satisfied the applied set at least one filter condition; processing the at least one message to distinguish the at least one message from other messages, the processing comprising outputting a message reception notification for the at least one message in a format different from that of the other messages; and displaying the at least one message.

2. The method of claim 1, wherein the displaying comprises: in response to setting the at least one filter condition to filter messages in a chatroom in which a user is currently staying, displaying the at least one message on a screen of the chatroom; and in response to setting the at least one filter condition as a common condition to filter messages in all chatrooms on the messenger, displaying the at least one message through a separate interface screen in a list format or a chatroom format.

3. The method of claim 1, wherein the setting comprises providing a filter list applicable to filter the messages in the at least one chatroom as a setting screen for setting the at least one filter condition, and the filter list is configured based on a chat history in the at least one chatroom.

4. The method of claim 3, wherein the filter list includes a message type filter for setting, as a filter condition of the at least one filter condition, at least one message type among a text message type, an image message type, a video message type, an audio message type, a call message type, and a sticker message type, and the message type filter is configured as a message type filter having a chat history in the at least one chatroom.

5. The method of claim 3, wherein the filter list corresponds to a type of the at least one chatroom, so that different filter lists are provided for different types of chatrooms.

6. The method of claim 1, wherein the setting comprises setting a filter condition of the at least one filter condition using a filter condition stored in a bookmark.

7. The method of claim 1, wherein the process further includes: sharing the at least one filter condition or the at least one message through a chatroom with another user selected by a user.

8. The method of claim 1, wherein the processing comprises: storing the at least one message in a separate message inbox.

9. A non-transitory computer-readable recording medium storing computer-readable instruction that are executable by at least one processor to provide the process recited in claim 1.

10. A computer apparatus comprising:
at least one memory storing computer-readable instructions; and
at least one processor that executes the computer-readable instructions stored in the at least one memory to provide a process including: setting at least one filter condition to filter messages in at least one chatroom on a messenger, the set at least one filter condition being applied to the messages to thereby provide a filter result including at least one message of the messages that satisfied the applied set at least one filter condition, processing the at least one message to distinguish the at least one message from other messages, the processing comprising outputting a message reception notification for the at least one message in a format different from that of the other messages; and displaying the at least one message.

11. The computer apparatus of claim 10, wherein the displaying comprises: in response to setting the at least one filter condition to filter messages in a chatroom in which a user is currently staying, display the at least one message on a screen of the chatroom, and in response to setting the at least one filter condition as a common condition to filter messages in all chatrooms on the messenger, display the at least one message through a separate interface screen in a list format or a chatroom format.

12. The computer apparatus of claim 10, wherein the setting comprises providing a filter list applicable to filter the messages in the at least one chatroom as a setting screen for setting the at least one filter condition, and the filter list is configured based on a chat history in the at least one chatroom.

13. The computer apparatus of claim 12, wherein the filter list includes a message type filter for setting, as a filter condition of the at least one filter condition, at least one message type among a text message type, an image message type, a video message type, an audio message type, a call message type, and a sticker message type, and the message type filter is configured as a message type filter having a chat history in the at least one chatroom.

14. The computer apparatus of claim 12, wherein the filter list corresponds to a type of the at least one chatroom, so that different filter lists are provided for different types of chatrooms.

15. The computer apparatus of claim 10, wherein the setting comprises setting a filter condition of the at least one filter condition using a filter condition stored in a bookmark.

16. The computer apparatus of claim 10, wherein the process further includes: sharing the at least one filter condition or the at least one message through a chatroom with another user selected by a user.

17. The computer apparatus of claim 10, wherein the processing comprises: storing the at least one message in a separate message inbox.

* * * * *